March 2, 1965     S. KAPLAN     3,171,322
ANCHOR BOLT
Filed Aug. 28, 1962
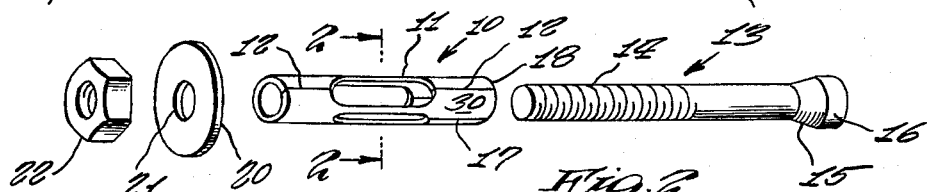
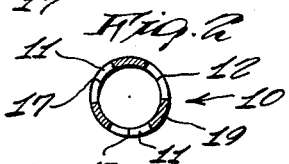
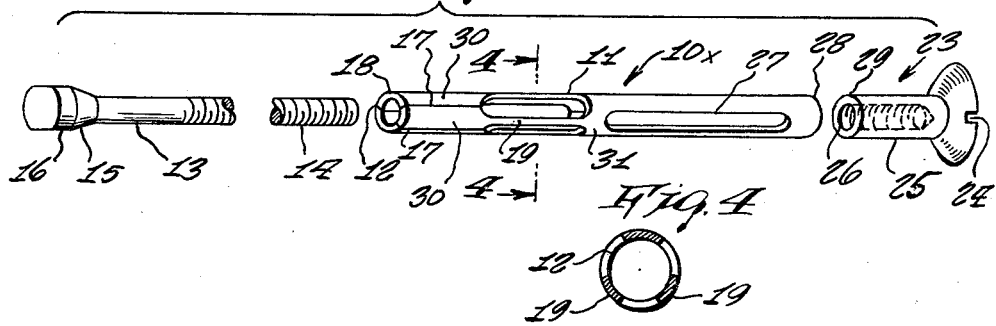
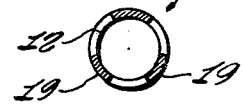
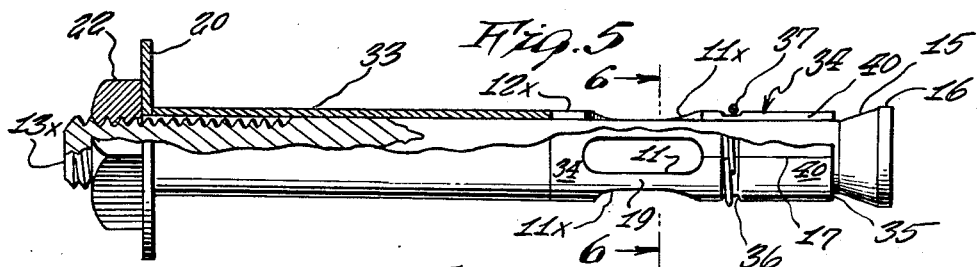
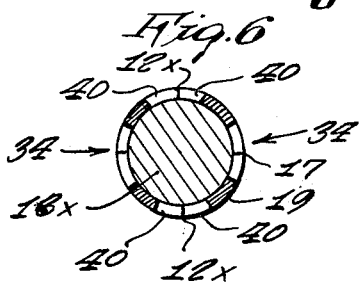

United States Patent Office 3,171,322
Patented Mar. 2, 1965

3,171,322
ANCHOR BOLT
Stanley Kaplan, 63 Florida St., Farmingdale, N.Y.
Filed Aug. 28, 1962, Ser. No. 219,899
1 Claim. (Cl. 85—77)

This invention relates to anchor bolts for use in masonry, brick and the like. More particularly it relates to an anchor bolt having a split cylindrical tubular skirt adapted to be displaced selectively and circumferentially by means of a bevel or cone surface operating against the rim of said skirt.

It is an object of this invention to provide an anchor bolt of simple construction and inexpensive manufacture.

It is another object to provide an anchor bolt that is selectively deformed at the innermost portion disposed in a cavity in a masonry block.

These and other objects of this invention will become apparent upon reading the following descriptive disclosure taken in conjunction with the accompanying drawing of a plurality of illustrative embodiments of the invention and in which;

FIG. 1 is an exploded side elevation view of the invention in its simplest form, showing a split sleeve having a split skirt portion and a threaded bolt having a beveled head portion, said sleeve being slidingly disposed on said bolt and means for pulling the bolt through the sleeve, FIG. 2 is a transverse section taken on line 2—2 of FIG. 1 and showing three split lines in the skirt portion of said sleeve, FIG. 3 is an exploded side elevation view of a modification of the invention showing the use of an internally threaded flat head adapted to receive a screw driver, said modification having a sleeve having primary apertures and at least one secondary aperture disposed linearly behind side primary apertures, FIG. 4 is a section view taken on line 4—4 of FIG. 3, FIG. 5 is a side elevation view of an assembled anchor bolt of another embodiment of this invention showing the manner of using a two piece expandable sleeve and further showing the use of a spacer collar in conjunction with said two piece sleeve, and FIG. 6 is a view taken on line 6—6 of FIG. 5.

Turning to FIG. 1 of the drawing, this invention is shown in a simple form thereof. In this form, a sleeve 10 of tubular construction is provided with a plurality of linear or elongated apertures 11, preferably three in number. The tubular sleeve 10 is preferably made from flat sheet metal and is therefore provided with a seam line 12. The seam line 12, formed by the abutment edges of the sheet metal, bisects one of the linear apertures 11 (FIG. 1).

A suitably long bolt 13 is provided with a suitably long threaded portion 14 and a head have a beveled cone surface 15. The head of the bolt is preferably provided with a cylindrical portion 16 for increased strength.

The outside diameter of the sleeve 10 and the outside diameter of the bolt portion 16 are preferably the same so that the hole bored into a masonry wall to receive the head 16 is uniform throughout.

The sleeve 10 is provided with cut lines 17 in the skirt portion thereof, said skirt portion being the portion that engages the beveled surface 16. The skirt portion of the sleeve 10 is thus provided with a rim 18 having the seam line 12 and two cut lines 17 terminating therein. As shown in FIG. 1, the provision of the linear apertures 11 in the sleeve 10, produces bridge portions 19 in the sleeve. These bridge portions are of narrow cross section, so that as the bolt 13 is pulled through a stationary sleeve 10 disposed in a cavity in a concrete block, the three portions constituting the skirt rim 18 are moved diametrically outward by the action of the beveled surface on the rim and thereafter on the inner surface of the sleeve adjacent the rim 18. Thus the three separate moveable edges constituting the rim 18 are moved substantially radially outward to seize the masonry wall of cavity, thereby locking the sleeve into the concrete.

Many means of drawing the bolt through a stationary sleeve 10 are possible. FIG. 1 shows the use of a conventional washer 20 having an aperture 21 to receive the threaded portion 14 of the bolt 13. The outside diameter of the sleeve 10 is larger than the washer aperture 21 so that the washer rests on the edge of the sleeve 10 opposite to the plural split rim 18. A nut 22 having suitable screw threads is provided for the threaded end 14 of bolt 13, which end protrudes suitably from the masonry wall. Clearly rotating nut 22 against washer 20 pulls the bolt 13 within the sleeve 10, the latter being firmly disposed in a masonry cavity of the same outside diameter. This action causes the three edges of rim 18 to move outwardly as the beveled surface 15 slidingly is pulled into the sleeve 10 at the rim 18, thereby causing the radially moved portions of the skirt to lockingly engage the masonry walls of the cavity.

Turning now to FIG. 3 there is shown a modification of this invention wherein a bolt 13 is provided with a modified nut 23. The nut 23 has a flat head provided with a slot 24 for receiving a screw driver. In lieu of a conventional slot 24 clearly a round or flat head provided with a Phillips slot may be used in conjunction with a Phillips type screw driver.

The modified nut 23 is also provided with a suitably long shank 25 and a threaded cavity is disposed in shank 25, the threads of which engage the threaded portion 14 of bolt 13.

As shown in FIG. 3, the sleeve 10X is modified by the provision of a suitably long secondary aperture 27 behind the apertures 11. The aperture 27 is disposed behind seam 12 in the sleeve area wherein the sleeve rim 28 engages the shank rim 29. In this modification, the tightening of screw 23 forces the sleeve 10X against the bevel area.

The sleeve 10 and also 10X are each provided with three lip sections 30 which move radially outwardly upon being forced against the bevel area 15. However, in the modification of FIG. 3, the sleeve itself buckles forming a circular hump or ridge in area 31 upon tightening of nut 23 after the lip sections have engaged the masonry walls in locking engagement.

In short, in the modification of FIG. 3, the sleeve 10X exgages the masonry cavity wall in which it is inserted at two locking areas, namely at the expanded rim 18 and at the expanded central area 31.

FIG. 5 shows another modification of this invention wherein the need is for huge anchor bolts. In this modification the huge bolt 13X is provided with a two part sleeve namely a cylindrical spacer 33 having no seam and a two piece element made up of two semi-cylindrical half pieces 34. These two half pieces 34 abut one another on a pair of diametrically opposed seam lines 12X. Two semi-cylindrical halves 34 meet in the vertical plane of the drawing. Each half piece 34 is provided with a full aperture 11 and two half aperture cuts 11X and a seam line 12X leading to the half rim 35.

The two half pieces 34 are each provided with a suitably located transverse channel 36 and a single loop spring 37 is disposed in the channel 36 about both half pieces 34 thereby retaining said pieces 34 against bolt 13X.

In the operation of the bolt of FIG. 5, pressure on the sleeve part 33 due to movement of nut 22 causes the four split lips 40 to move outwardly at their rim 35 when said rim is pushed upwardly on the bevel surface 15 by action of nut 22.

Where the anchor bolt has a free threaded end 14 of bolt 13 protruding from the wall in which the bolt is anchored, this end is used to attach lighting or other fixtures thereto.

Other modifications and obvious changes will now become readily apparent to those skilled in the art upon reading this disclosure. Thus, for example, in suitable circumstances plastic sleeves and plastic nuts 23 made, for example, of nylon are operable.

However all such modifications are deemed to be within the scope of this invention.

Moreover, the bolt 13 may be pulled by means of an external tool adapted to seize and turn the bolt against the sleeve. Where such tools are used the threaded nuts are unnecessary.

I claim:

A cylindrical anchor bolt of uniform diameter throughout adapted to be inserted in a masonry cavity of like diameter comprising a bolt threaded at one end and provided with a beveled head at the other end, said head having the diameter of said cavity, a sheet metal cylindrical sleeve having a seam from end to end and of a uniform diameter equal to that of the bolt head and the cavity, said sleeve being disposed on said bolt and having a plurality of three radially disposed elongated axial apertures adjacent the inner sleeve end engaging the bevel of said bolt, said sleeve having slits communicating between each of said apertures and the rim of the sleeve engaging said bevel, thereby forming a plurality of resilient metal fingers having narrow flexible bridge portions for engaging the cavity wall at the rim ends of said fingers, and threaded nut means disposed on said threaded end of said bolt, said sleeve also having a secondary elongated axial aperture disposed adjacent the outer sleeve end and opposite said end to end seam, said secondary aperture and said radially disposed apertures providing an intermediate area therebetween adapted to buckling forces on tightening of said threaded means whereby said sleeve is locked to said masonry cavity wall at its inner finger extended rim end and also by engagement of the buckle sheet metal in said intermediate area.

References Cited by the Examiner
UNITED STATES PATENTS

| | | | |
|---|---|---|---|
| 699,245 | 5/02 | Russell | 85—85 |
| 702,255 | 6/02 | Stockman. | |
| 1,111,660 | 9/14 | Malaby | 85—71 |
| 1,619,757 | 3/27 | Pelkey. | |
| 2,313,616 | 3/43 | Bowersox. | |
| 2,570,003 | 10/51 | Palmer. | |
| 2,632,354 | 3/53 | Black. | |

FOREIGN PATENTS 11,612   5/14   Great Britain.

EDWARD C. ALLEN, *Primary Examiner.*